United States Patent
Lee et al.

(10) Patent No.: US 8,384,870 B2
(45) Date of Patent: Feb. 26, 2013

(54) DISPLAY SUBSTRATE, METHOD OF MANUFACTURING THE SAME AND DISPLAY PANEL HAVING THE DISPLAY SUBSTRATE

(75) Inventors: Hong-Woo Lee, Cheonan-si (KR); Jong-Oh Kim, Cheonan-si (KR); Sung-Man Kim, Seoul (KR); Sun-Kyu Joo, Seoul (KR); Bong-Jun Lee, Seoul (KR); Jae-Min Shin, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 13/468,583

(22) Filed: May 10, 2012

(65) Prior Publication Data

US 2012/0218486 A1 Aug. 30, 2012

Related U.S. Application Data

(62) Division of application No. 12/181,678, filed on Jul. 29, 2008, now Pat. No. 8,203,682.

(30) Foreign Application Priority Data

Jan. 25, 2008 (KR) .................................. 2008-7945

(51) Int. Cl.
*G02F 1/1343* (2006.01)
(52) U.S. Cl. ........................... 349/147; 349/38; 349/141
(58) Field of Classification Search ....................... None
See application file for complete search history.

(56) References Cited

U.S. PATENT DOCUMENTS

2006/0146260 A1* 7/2006 Lee ............................... 349/143

* cited by examiner

*Primary Examiner* — Lucy Chien
(74) *Attorney, Agent, or Firm* — F. Chau & Associates, LLC

(57) ABSTRACT

A display substrate includes a first switching element, a second switching element, a first pixel electrode, a second pixel electrode, a main storage electrode and a sub-storage electrode. The first switching element is connected to a data line and a first gate line. The second switching element is connected to the data line and a second gate line adjacent to the first gate line. The first pixel electrode is electrically connected to the first switching element. The second pixel electrode is electrically connected to the second switching element. The main storage electrode is disposed in an area between the first pixel electrode and the second electrode to overlap with first ends of the first and second pixel electrodes. The sub-storage electrode is spaced apart from the first and second gate lines.

12 Claims, 10 Drawing Sheets

DISPLAY SUBSTRATE, METHOD OF MANUFACTURING THE SAME AND DISPLAY PANEL HAVING THE DISPLAY SUBSTRATE

CROSS-REFERENCE TO RELATED APPLICATIONS

This application is a divisional application of U.S. application Ser. No. 12/181,678 filed Jul. 29, 2008 now U.S. Pat. No. 8,203,682, which claims priority under 35 U.S.C. §119 to Korean Patent Application No. 10-2008-0007945, filed on Jan. 25, 2008 in the Korean Intellectual Property Office (KIPO), the disclosures of which are incorporated by reference herein in their entireties.

BACKGROUND OF THE INVENTION

1. Technical Field

The present disclosure relates to a display substrate, a method of manufacturing the display substrate, and a display panel having the display substrate, which may be used in a liquid crystal display (LCD) device.

2. Discussion of Related Art

A liquid crystal display (LCD) device includes an LCD panel and a backlight assembly providing the LCD panel with light. The LCD panel includes a plurality of data lines and a plurality of gate lines crossing the data lines.

A pixel structure having a decreased number of data lines has been used to reduce manufacturing costs. The pixel structure includes a common data line and left and right pixels that receive data voltages through the common data line. A display panel having the pixel structure may generate erroneous vertical lines, which appear as a flicker on the display. The vertical lines may be caused by a coupling capacitance between the data line and the pixel electrode, between the pixel electrode and the gate line, between the left pixel electrode and the right pixel electrode, etc.

In a display panel having the pixel structure, the number of the data lines is decreased by half, but the number of the gate lines is doubled. Thus, a plurality of pixels arranged in a horizontal row is driven by two gate lines arranged on upper and lower sides of the pixels. A display panel having the pixel structure may have a reduced transmittance and aperture ratio.

Thus, there is a need for a display panel with an improved image quality and aperture ratio.

SUMMARY OF THE INVENTION

In an exemplary embodiment of the present invention, a display substrate includes a first switching element, a second switching element, a first pixel electrode, a second pixel electrode, a main storage electrode and a sub-storage electrode. The first switching element is connected to a data line and a first gate line. The second switching element is connected to the data line and a second gate line adjacent to the first gate line. The first pixel electrode is electrically connected to the first switching element. The second pixel electrode is electrically connected to the second switching element, and the second pixel electrode is disposed adjacent to the first pixel electrode and extends in a direction of the second gate line. The main storage electrode is disposed in an area between the first pixel electrode and the second pixel electrode to overlap with first ends of the first and second pixel electrodes, and the main storage electrode receives a common voltage. The sub-storage electrode is spaced apart from the first and second gate lines, and the sub-storage electrode is partially overlapped with second ends of the first and second pixel electrodes.

In an exemplary embodiment of the present invention, there is provided a method of manufacturing a display substrate. In the method, a first conductive pattern is formed on a base substrate, and the first conductive pattern includes a data line, a coupling line protruding from the data line, a gate electrode of a first switching element, a gate electrode of a second switching electrode, a sub-storage electrode remaining in an electrically floating state in a first pixel area and a second pixel area adjacent to the first pixel area. A second conductive pattern is formed on the base substrate having the first conductive pattern formed thereon, and the second conductive pattern including a first gate line, a second gate line adjacent to the first gate line, a source electrode of the first switching element, and a main storage electrode disposed in a boundary area between the first and second pixel areas. A third conductive pattern is formed on the base substrate having the second conductive pattern formed thereon, and the third conductive pattern including a first contact electrode connecting the first gate line with the gate electrode of the first switching element, a second contact electrode connecting the data line with the source electrode of the first switching element, a third contact electrode connecting the second gate line with the gate electrode of the second switching element, the fourth contact electrode connecting the coupling line with the source electrode of the second switching element, a first pixel electrode formed in the first pixel area, and a second pixel electrode formed in the second pixel electrode.

In an exemplary embodiment of the present invention, a display panel includes a display substrate and an opposite display substrate. The display substrate includes a first switching element being connected to a data line and a first gate line, a second switching element being connected to the data line and a second gate line adjacent to the first gate line, a first pixel electrode being electrically connected to the first switching element, a second pixel electrode being electrically connected to the second switching element, and the second pixel electrode is disposed adjacent to the first pixel electrode and extends in a direction of the second gate line, a main storage electrode being disposed in an area between the first pixel electrode and the second electrode to overlap with first ends of the first and second pixel electrodes, and the main storage electrode receives a common voltage, and a sub-storage electrode being spaced apart from the first and second gate lines, and the storage electrode is partially overlapped with second ends of the first and second pixel electrodes. The opposing display substrate couples to the display substrate to receive a liquid crystal layer and the opposite substrate including a common electrode.

BRIEF DESCRIPTION OF THE DRAWINGS

The present invention will become more readily apparent by describing in detail exemplary embodiments thereof with reference to the accompanying drawings, in which.

DETAILED DESCRIPTION OF EXEMPLARY EMBODIMENTS

The invention is described more fully hereinafter with reference to the accompanying drawings, in which embodiments of the invention are shown. This invention may, however, be embodied in many different forms and should not be construed as limited to the embodiments set forth herein. It will be understood that when an element or layer is referred to as being "on," "connected to" or "coupled to" another element or layer, it can be directly on, connected or coupled to the other element or layer or intervening elements or layers may be present. Hereinafter, exemplary embodiments of the present invention will be explained in more detail with reference to the accompanying drawings.

Figure 1:
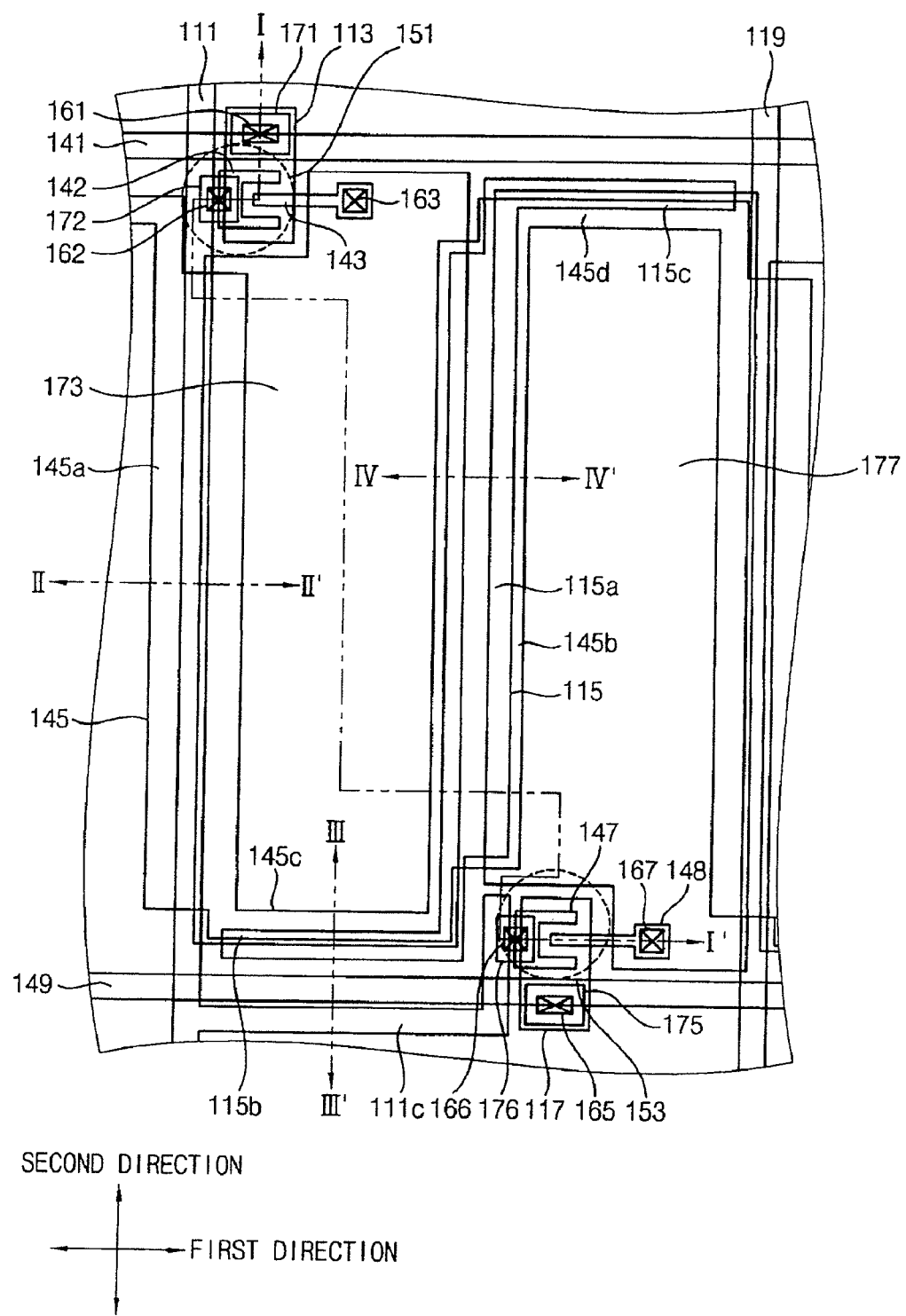
FIG. 1 is a plan view illustrating a display panel according to an exemplary embodiment of the present invention.
Figure 2:
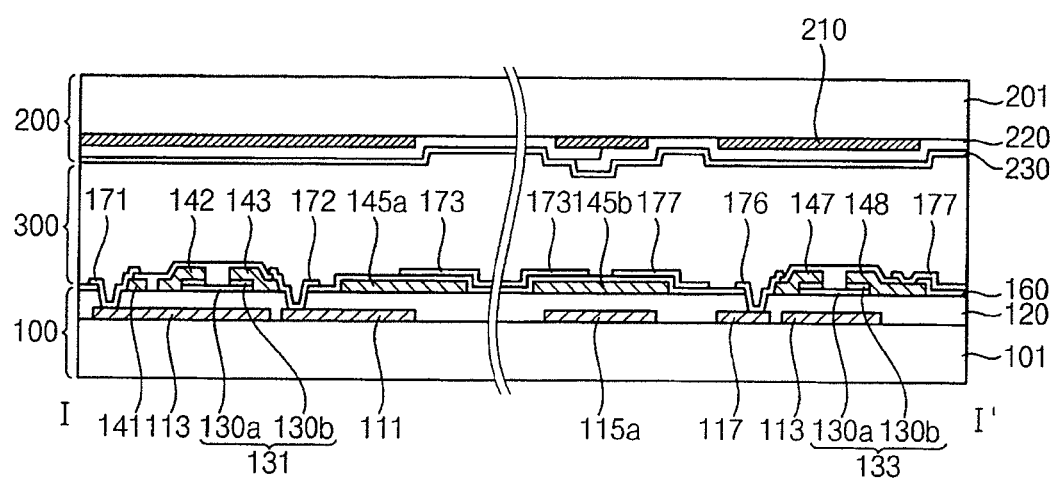
FIG. 2 is a cross-sectional view taken along a line I-I' in FIG. 1.

FIG. 1 is a plan view illustrating a display panel according to an exemplary embodiment of the present invention. FIG. 2 is a cross-sectional view taken along a line I-I' in FIG. 1. Referring to FIGS. 1 and 2, a display panel includes a display substrate 100, an opposing substrate 200 and a liquid crystal layer 300.

The display substrate 100 includes a base substrate 101 that defines a plurality of the pixel areas having N×M pixel areas (N and M are natural numbers). The display substrate 100 includes a plurality of the gate lines 141 and 149, a plurality of the data lines 111 and 119, a plurality of the switching elements 151 and 153, a main storage electrode 145 and a sub-storage electrode 115 formed on the base substrate 101.

The base substrate 101 includes 2N gate lines 141 and 149 extending along a first direction and M/2 data lines 111 and 119 extending along a second direction crossing the first direction.

The data lines 111 and 119 form a first conductive pattern patterned from a first conductive layer, and a first insulation layer 120 is formed on the base substrate 101 on which the first conductive pattern is formed. The first insulation layer 120 will hereinafter be described as a gate insulation layer. The gate lines 141 and 149 form a second conductive pattern patterned from a second conductive layer, and the gate lines 141 and 149 are formed on the gate insulation layer 120. A second insulation layer 160 is formed on the base substrate 101 on which the second conductive pattern is formed. The second insulation layer 160 will hereinafter be described as a protective layer.

The display substrate 100 has a first pixel area P1 and a second pixel area P2 adjacent to the first pixel area P1 extending in the first direction. A first switching element 151 is formed in the first pixel area P1 adjacent to an area in which a first gate line 141 crosses a data line 111. The first switching element 151 includes a gate electrode 113, a semiconductor pattern 131, a source electrode 142 and a drain electrode 143. The gate electrode 113 is part of the first conductive pattern, and the source and drain electrodes 142 and 143 are part of the second conductive pattern.

The gate electrode 113 of the first conductive pattern is electrically connected to the first gate line 141 of the second conductive pattern via a first contact electrode 171. The source electrode 142 of the second conductive pattern is electrically connected to the data line 111 of the first conductive pattern via a second contact electrode 172. The drain electrode 143 is electrically connected to a first pixel electrode 173 formed in the first pixel area P1.

A second switching element 153 is formed in the second pixel area P2 adjacent to an area in which a second gate line 149 adjacent to the first gate line 141 crosses the data line 111. The second switching element 153 is adjacent to an area in which the second gate line 149 is formed, and is adjacent to a boundary area between the first and second areas P1 and P2. The second switching element 153 includes a gate electrode 117, a semiconductor pattern 133, a source electrode 147 and a drain electrode 148. The gate electrode 117 is part of the first conductive pattern, and the source and drain electrodes 147 and 148 are part of the second conductive pattern.

The gate electrode 117 of the first conductive pattern is electrically connected to the second gate line 149 of the second conductive pattern via a third contact electrode 175. The source electrode 147 of the second conductive pattern is electrically connected to a coupling line 111c protruding from the data line 111 of the first conductive pattern via a fourth contact electrode 176. The drain electrode 148 is electrically connected to a second pixel electrode 177 formed in the second pixel area P2.

The main storage electrode 145 is formed in an area between the first and second pixel areas P1 and P2 to receive a common voltage. The sub-storage electrode 115 is formed in an area adjacent to the gate lines 141 and 149 to not receive the common voltage. The main storage electrode 145 is part of the second conductive pattern, and the sub-storage electrode 115 is part of the first conductive pattern. The main storage electrode 145 is formed in areas in common with the pixel areas, and the sub-storage electrode 115 is formed in the first pixel area P1 and the second pixel area P2 adjacent to the first pixel area P1 to remain in an electrically floating state.

For example, the main storage electrode 145 includes a first portion 145a overlapped with the data line, a second portion 145b disposed in an area between the first and second pixel P1 and P2 to overlap with first ends of the first and second pixel electrodes 173 and 177, a third portion 145c being adjacent to the second gate line 149 to connect one end of the first portion 145a with one end of the second portion 145b, and a fourth portion 145d being adjacent to the first gate line 141 to connect another end of the second portion 145b. The main storage electrode 145 is repeatedly formed to extend in the second direction.

The sub-storage electrode 115 includes a first portion 115a overlapped with the second portion 145b of the main storage electrode 145, a second portion 115b partially overlapped with the third portion 145c of the main storage electrode 145, and a third portion 115c partially overlapped with the fourth portion 145d of the main storage electrode 145. The second portion 115b is adjacent to the second gate line 149 to connect with the one end of the first portion 115a, and the third portion 115c adjacent to the first gate line 141 to connect with the other end of the first portion 115a. The second portion 115b is partially overlapped with another end of the first pixel electrode 173, and the third portion 115c is partially overlapped with another end of the second pixel electrode 177.

The main and sub-storage electrodes 145 and 115 may be symmetrically formed in the first and second pixel areas P1 and P2.

An opposing base substrate 201 is divided into a transmission area and a blocking area by the blocking pattern 210, and the transmission area corresponds to the pixel areas.

For example, the blocking pattern 210 is formed in an area corresponding to the gate lines 141 and 149, the data lines 111 and 119 and a boundary area of the first and second areas P1 and P2. The first portion 115a of the sub-storage electrode 115 and the second portion 145b of the main storage electrode 145 are formed in the boundary area.

The color filter 220 is formed on the opposing base substrate 201 corresponding to areas in which the first and second pixel electrodes 173 and 177 are formed. The common electrode 230 is formed on the opposing base substrate 201 on which the color filter 220 is formed to oppose the first and second pixel electrodes 173 and 177.

Figure 3:
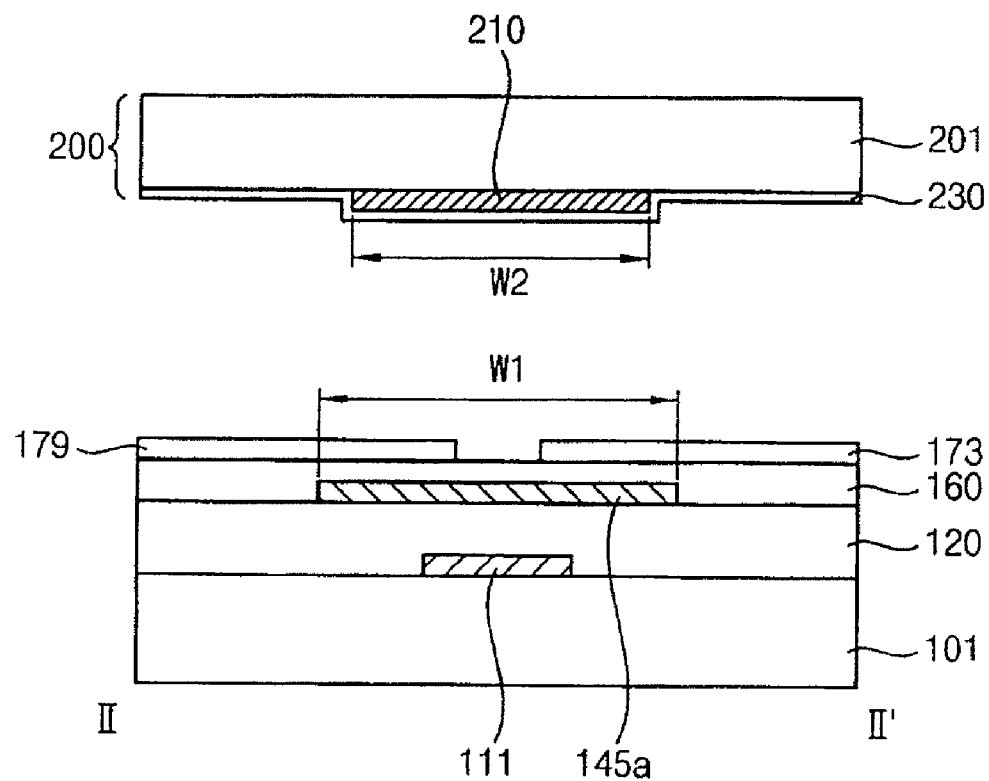
FIG. 3 is a cross-sectional view taken along a line II-II' in FIG. 1.

FIG. 3 is a cross-sectional view taken along a line II-II' in FIG. 1. Referring to FIGS. 1 and 3, the display panel includes the display substrate 100 and the opposing substrate 200. The display substrate 100 includes the data line 111, the gate insulation layer 120, the first portion 145a of the main storage electrode 145, the protective insulation layer 160, the first pixel electrode 173 and a third pixel electrode 179 spaced apart from the first pixel electrode 173 sequentially formed on the base substrate 101. The data line 111 is formed from the first conductive layer, the first portion 145a is formed from the second conductive layer, and the first and third pixel electrodes are formed from the third conductive layer. The opposing substrate 200 includes the blocking pattern 210 and the common electrode 230 sequentially formed on the opposing base substrate 201.

The gate insulation layer 120, the first portion 145a of the main storage electrode 145 and the protective insulation layer 160 are disposed between the data line 111 and the first pixel electrode 173. A distance between the data line 111 and the first pixel electrode 173 is increased by the gate insulation layer 120, the first portion 145a of the main storage electrode 145 and the protective insulation layer 160 to decrease coupling capacitance between the data line 111 and the first pixel electrode 173.

The first portion 145a of the main storage electrode 145 has a first width W1 that is larger than the width of the data line 111, and the first portion 145a of the main storage electrode 145 is overlapped with the data line 111. Thus, the first portion 145a of the main storage electrode 145 may block light that leaks from an area between the first pixel electrode 173 and the third pixel electrode 179.

The blocking pattern 210 of the opposing substrate 200 corresponding to the first portion 145a of the main storage electrode 145 may be formed to have a second width W2 that is smaller than the first width W1. The second width W2 of blocking pattern 210 may be reduced, so that the transmittance and aperture ratio of the display panel may be improved.

Figure 4:
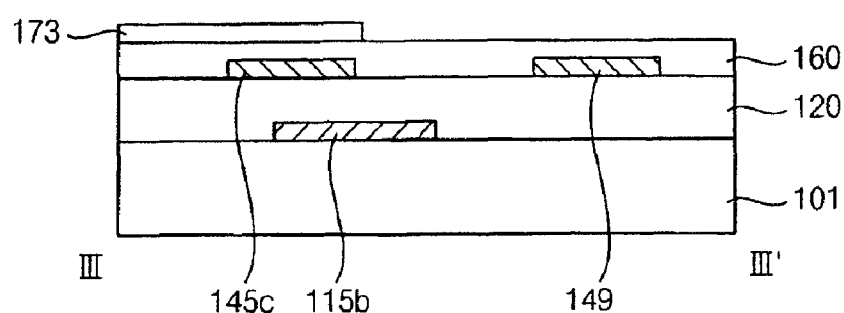
FIG. 4 is a cross-sectional view taken along a line III-III' in FIG. 1.

FIG. 4 is a cross-sectional view taken along a line III-III' in FIG. 1. Referring to FIGS. 1 and 4, the display substrate 100 includes the second portion 115b of the sub-storage electrode 115, the third portion 145c of the main storage electrode 145, the second gate line 149 and the first pixel electrode 173. The second portion 115b of the sub-storage electrode 115 is formed from the first conductive layer. The third portion 145c of the main storage electrode 145 and the second gate line 149 are formed from the second conductive layer. The first pixel electrode 173 is formed from the third conductive layer.

The third portion 145c of the main storage electrode 145 and the second gate line 149 are spaced apart from each other. The second portion 115b of the sub-storage electrode 115 is partially overlapped with the third portion 145c of the main storage electrode 145, and is spaced apart from the second gate line 149. The end of the first pixel electrode 173 is partially overlapped with the second portion 115b of the sub-storage electrode 115.

The second portion 115b of the sub-storage electrode 115 is sufficiently overlapped with the third portion 145c of the main storage electrode 145 to hold the common voltage of a direct current that is received in the third portion 145c of the main storage electrode 145.

The second portion 115b of the sub-storage electrode 115 holds the common voltage of the direct current to shield the coupling capacitance between the first pixel electrode 173 and the second gate line 149. When the second gate line 149 receives a gate turn-on voltage, a pixel voltage of the first pixel electrode 173 is dropped by a second kickback voltage. Thus, the second portion 115b of the sub-storage electrode 115 prevents the second kickback voltage of the first pixel electrode 173 from driving the second gate line 149.

Figure 5:
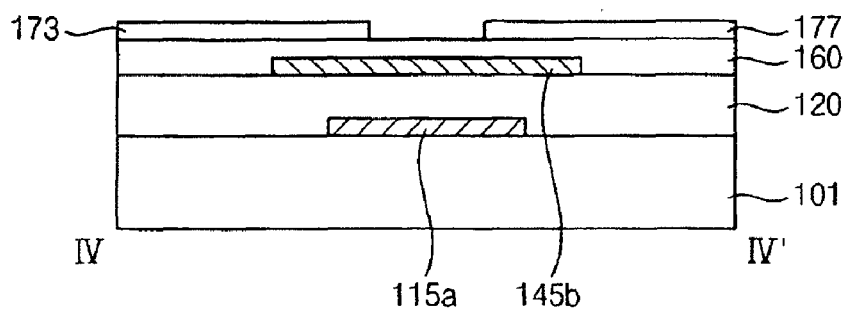
FIG. 5 is a cross-sectional view taken along a line IV-IV' in FIG. 1.

FIG. 5 is a cross-sectional view taken along a line IV-IV' in FIG. 1. Referring to FIGS. 1 and 5, the display substrate 100 includes the first portion 115a of the sub-storage electrode 115, the second portion 145b of the main storage electrode 145, and the second pixel electrode 177. The first portion 115a of the sub-storage electrode 115 is formed from the first conductive layer. The second portion 145b of the main storage electrode 145 is formed from the second conductive layer. The first and second pixel electrodes 173 and 177 are formed from the third conductive layer.

The first pixel area P1 defines a storage capacitor that includes the second portion 145b of the main storage electrode 145, the protective layer 160 and the first electrode 173. The second pixel area P2 defines a storage capacitor that includes the second portion 145b of the main storage electrode 145, the protective layer 160 and the second electrode 177. The protective layer 160 may have a thickness of about 2,000 Å, and the gate insulation layer 120 may have a thickness of about 4,200 Å.

The second portion 145b of the main storage electrode 145 is overlapped with the first and second pixel electrodes 173 and 177 to shield the coupling capacitance between the first and second pixel electrodes 173 and 177. Thus, the coupling capacitance between the first and second pixel electrodes 173 and 177 may be reduced, so that high quality images may be displayed.

For example, when the main storage electrode is formed from the first conductive layer, a distance between the storage electrode and the pixel electrode may be about 6,200 Å, which may be a thickness of the gate insulation layer 120 and the protective layer 160.

In at least one embodiment of the present invention, when the storage electrode is formed from the second conductive layer, a distance between the storage electrode and the pixel electrode may be about 2,000 Å, which may be a thickness of the protective layer 160. A shielding effect of the main storage electrode 145 formed from the second conductive layer may be about three times higher than a shielding effect of the main storage electrode 145 formed from the first conductive layer.

Therefore, the storage capacitance may be increased, so that the shielding effect of the coupling capacitance between the first and second electrodes may be improved.

Hereinafter, a method of manufacturing a display substrate according to an exemplary embodiment of the present invention will be described.

Figure 6A:
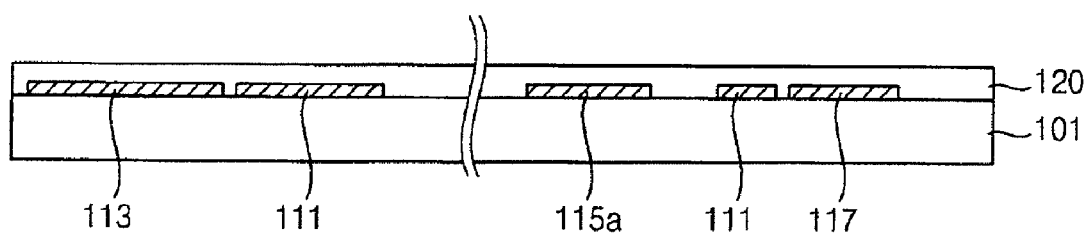
FIGS. 6A and 6B are a cross-sectional view and a plan view illustrating processes for manufacturing a first conductive pattern shown in FIG. 2.
Figure 6B:
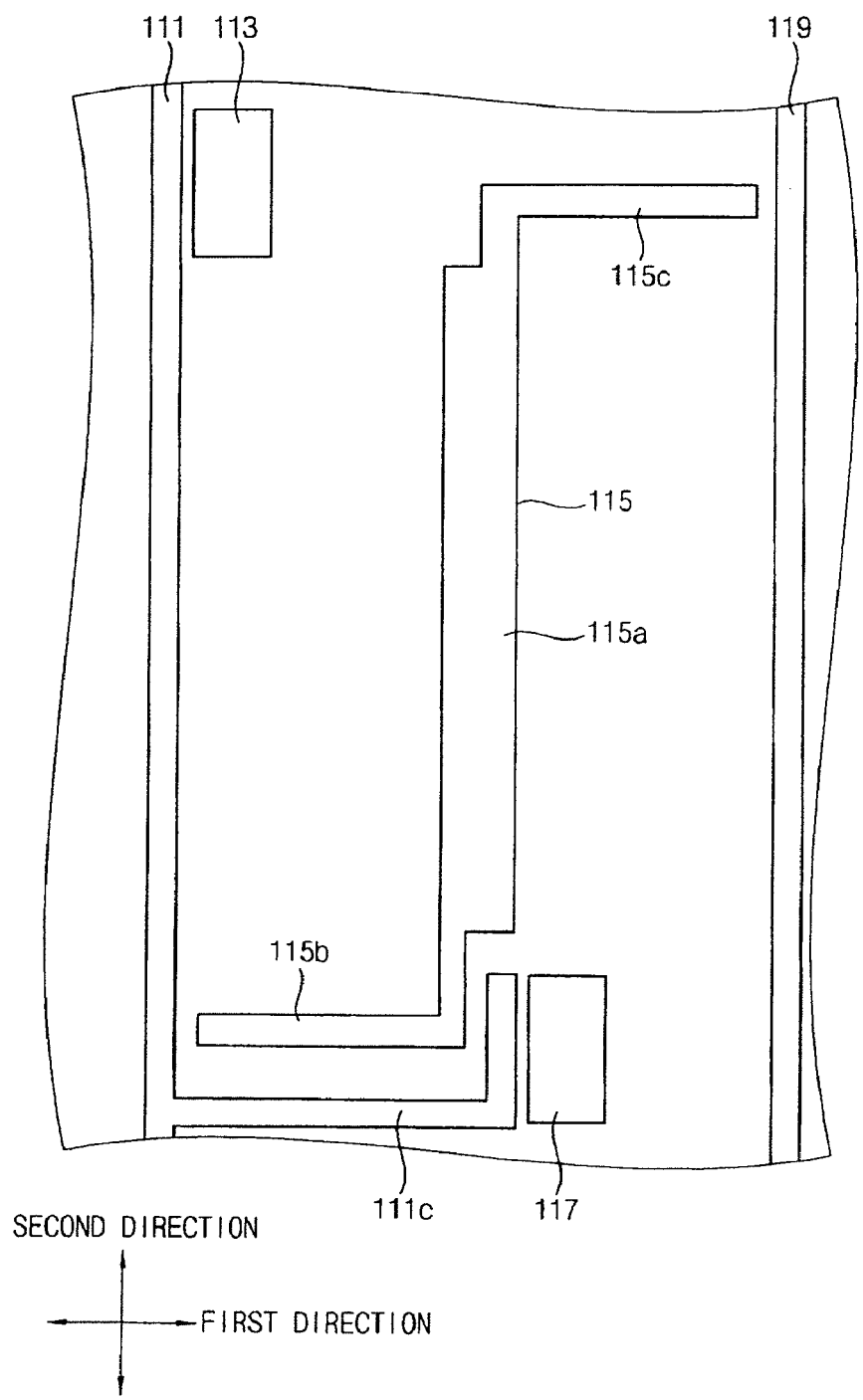

FIGS. 6A and 6B are a cross-sectional view and a plan view illustrating processes for manufacturing the first conductive pattern shown in FIG. 2.

Referring to FIGS. 6A and 6B, the first conductive layer is formed on the base substrate 101. The first conductive pattern is formed from the first conductive layer. The first conductive pattern includes the data lines 111 and 119, the coupling line 111c, the gate electrode 113 of the first switching element 151, the gate electrode 117 of the second switching element 153 and the first and second portions 115a and 115b of the sub-storage electrode 115.

The data lines 111 and 119 extend in the second direction, the coupling line 111c extends from the data line 111 in the first direction crossing the second direction. The gate electrodes 113 and 117 of the first and second switching elements 151 and 153 are spaced apart from the data line 111.

The first portion 115a of the sub-storage electrode 115 is formed in the boundary area between first and second pixel areas P1 and P2. The second portion 115b of the sub-storage electrode 115 extends from one end of the first portion 115a to the first pixel area P1. The third portion 115c of the sub-storage electrode 115 extends from another end of the first portion 115a to the second pixel area P2. The sub-storage electrode 115 may be symmetrically formed in the first and second pixel areas P1 and P2.

The gate insulation layer 120 is formed on the base substrate 101 on which the first conductive pattern is formed. The gate insulation layer 120 may have a thickness of about 4,200 Å.

Figure 7A:
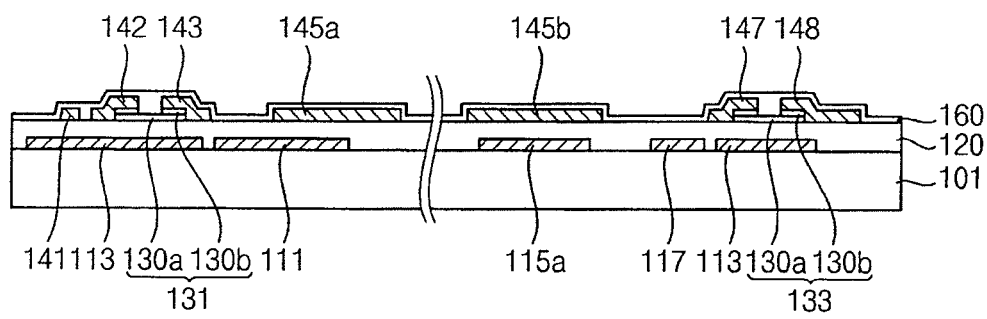
FIGS. 7A and 7B are a cross-sectional view and a plan view illustrating processes for manufacturing a second conductive pattern shown in FIG. 2.
Figure 7B:
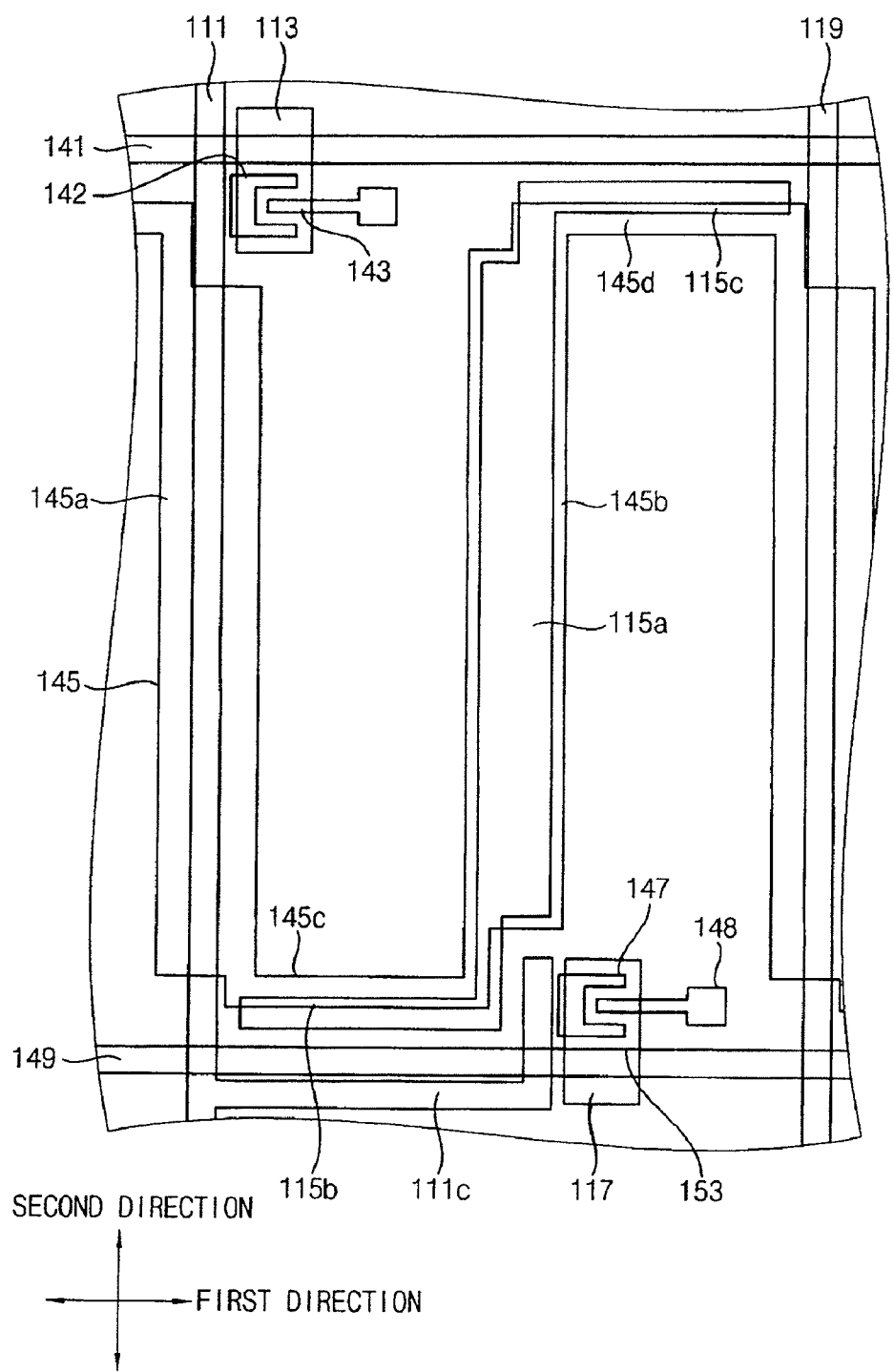

FIGS. 7A and 7B are a cross-sectional view and a plan view illustrating processes for manufacturing the second conductive pattern shown in FIG. 2. Referring to FIGS. 7A and 7B, a semiconductor layer is formed on a base substrate formed on the insulation layer 120. The semiconductor layer includes an active layer 130a doped with impurities and an ohmic contact layer 130b formed on the active layer 130a.

A plurality of the semiconductor patterns 131 and 133 are formed from the semiconductor layer, are disposed on the gate electrodes 113 and 117 of the first and second switching elements 151 and 153.

The conductive layer is formed on the base substrate 101 having the semiconductor patterns 131 and 133 formed thereon. The second conductive pattern is formed from the second conductive layer. The second conductive pattern includes the gate lines 141 and 149, source and drain electrodes 142 and 143 of the first switching element 151, the source and drain electrodes 147 and 148 of the second switching element 153, and the main storage electrode 145.

The gate lines 141 and 149 extend in the first direction. The source electrode 142 of the first switching element 151 is spaced apart from the first gate line 141 and the drain electrode 143 of the first switching element 151 is spaced apart from the source electrode 142. The source electrode 147 of the first switching element 153 is spaced apart from the second gate line 149 and the drain electrode 148 of the second switching element 153 is spaced apart from the source electrode 147.

The main storage electrode 145 includes the first portion 145a overlapped with the data line 111, the second portion 145b overlapped with the first portion 115a of the sub-storage electrode 115, the third portion 145c partially overlapped with the second portion 115b of sub-storage electrode 115, and the fourth portion 145d partially overlapped with the third portion 115c of the sub-storage electrode 115.

Figure 8A:
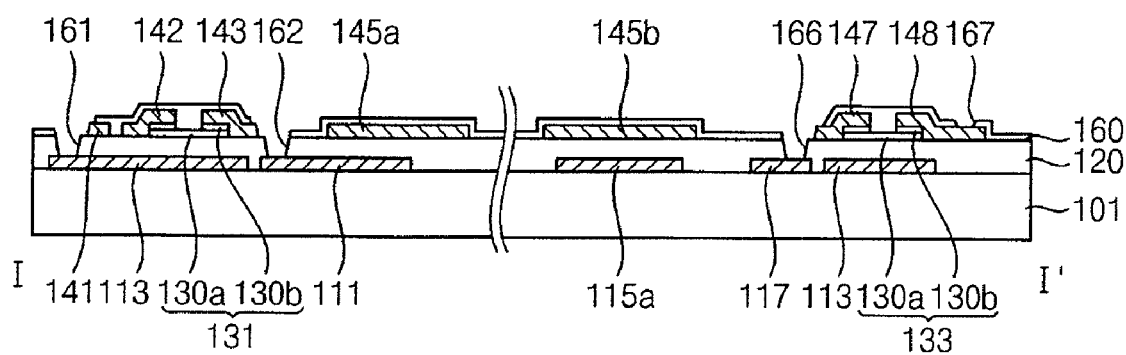
FIGS. 8A and 8B are a cross-sectional view and a plan view illustrating processes for manufacturing a third conductive pattern shown in FIG. 2.
Figure 8B:
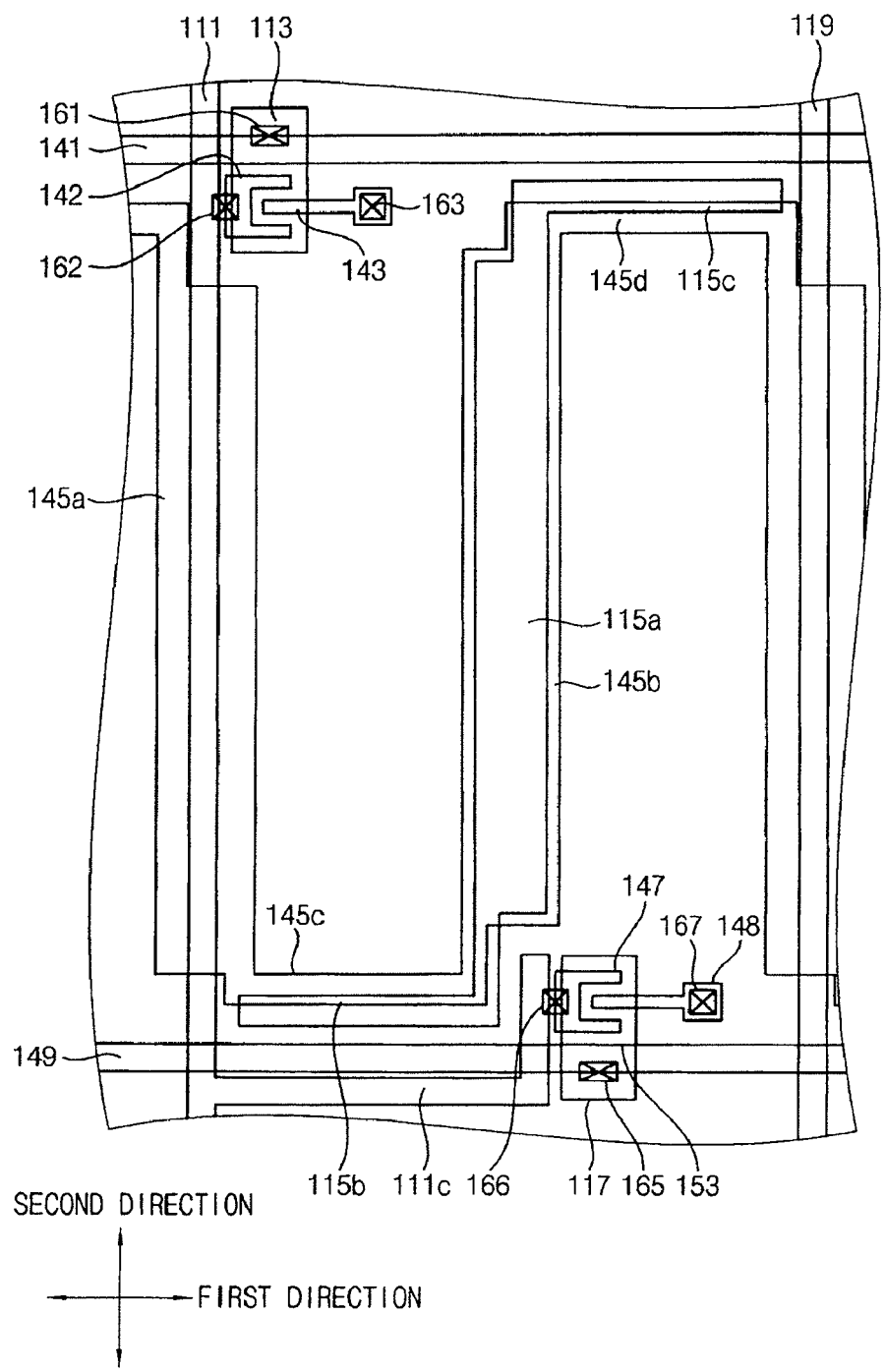

FIGS. 8A and 8B are a cross-sectional view and a plan view illustrating processes for manufacturing the third conductive pattern shown in FIG. 2.

Referring to FIGS. 1, 8A and 8B, the protective layer 160 and the gate insulation layer 120 are etched to form a plurality of contact holes 161, 162, 163, 165, 166 and 167. For example, a first contact hole 161 may be formed by etching the protective layer 160 and the gate insulation layer 120 to expose the first gate line 141 and the gate electrode 113 of the first switching element 151. A second contact hole 162 may be formed by etching the protective layer 160 and the gate insulation layer 120 to expose the data line 111 and the source electrode 142 of the first switching element 151. A third contact hole 163 may be formed by etching the protective layer 160 to expose the drain electrode 143 of the first switching element 151.

A fourth contact hole 165 may be formed by etching the protective layer 160 and the gate insulation layer 120 to expose the second gate line 149 and the gate electrode 117 of the second switching element 153. A fifth contact hole 166 may be formed by etching the protective layer 160 and the gate insulation layer 120 to expose the coupling line 111c and the source electrode 147 of the second switching element 153. A sixth contact hole 167 may be formed by etching the protective layer 160 to expose the drain electrode 148 of the second switching element 153.

The third conductive layer is formed on the base substrate 101 having the contact holes 161, 162, 163, 165, 166 and 167 formed thereon. The third conductive layer is patterned to the third conductive pattern. For example, the conductive layer may include a transparent conductive material. The third conductive pattern includes a plurality of contact electrodes 171, 172, 175 and 176 and the pixel electrodes 173 and 177.

A first contact electrode 171 electrically connects the first gate line 141 with the gate electrode 113 of the first switching element 151 via the first contact hole 161. A first contact electrode 171 electrically connects the first gate line 141 with the gate electrode 113 of the first switching element 151 via the first contact hole 161. A third contact electrode 175 electrically connects the second gate line 149 with the gate electrode 117 of the second switching element 153 via the fourth contact hole 165. A fourth contact electrode 176 electrically connects the coupling line 111c with the source electrode 147 of the second switching element 153 via the fifth contact hole 166.

The first pixel electrode 173 is electrically connected to the drain electrode 143 of the first switching element 151 via the third contact hole 163. The second pixel electrode 177 is electrically connected to the drain electrode 148 of the second switching element 153 via the sixth contact hole 167.

According to at least one embodiment of the present invention, coupling capacitance caused vertical lines may be reduced so that high quality images may be displayed on a display panel having a pixel structure with a decreased number of data lines. In addition, the transmittance and aperture ratio of the display panel having a pixel structure with a decreased number of data lines may be improved.

Having described the embodiments of the present invention, it is to be understood that various changes, substitutions and alterations can be made herein without departing from the spirit and scope of the invention.

What is claimed is:

1. A method of manufacturing a display substrate comprising:
    forming a first conductive pattern on a base substrate, and the first conductive pattern includes a data line, a coupling line protruding from the data line, a gate electrode of a first switching element, a gate electrode of a second switching electrode, a sub-storage electrode remaining in an electrically floating state in a first pixel area and a second pixel area adjacent to the first pixel area;
    forming a second conductive pattern on the base substrate having the first conductive pattern formed thereon, and the second conductive pattern including a first gate line, a second gate line adjacent to the first gate line, a source electrode of the first switching element, and a main storage electrode disposed in a boundary area between the first and second pixel areas; and forming a third conductive pattern on the base substrate having the second conductive pattern formed thereon, and the third conductive pattern including a first contact electrode connecting the first gate line with the gate electrode of the first switching element, a second contact electrode connecting the data line with the source electrode of the first switching element, a third contact electrode connecting the second gate line with the gate electrode of the second switching element, the fourth contact electrode connecting the coupling line with the source electrode of the second switching element, a first pixel electrode formed in the first pixel area, and a second pixel electrode formed in the second pixel electrode.

2. The method of claim 1, wherein the main storage electrode includes a first portion overlapped with the data line, a second portion disposed in a region interposed between the first and second pixel electrodes, a third portion adjacent to the second gate line to connect one end of the first portion with a first end of the second portion, and a fourth portion adjacent to the first gate line to connect to a second end of the second portion.

3. The method of claim 2, wherein the sub-storage electrode includes a first portion overlapped with the second portion of the main storage electrode, a second portion partially overlapped with the third portion of the main storage electrode, and a third portion partially overlapped with the fourth portion of the main storage electrode.

4. A display panel comprising:
a display substrate and an opposing display substrate coupled to the display substrate, the opposing substrate including a common electrode, wherein the display substrate comprises:
a first switching element connected to a data line and a first gate line;
a second switching element connected to the data line and a second gate line adjacent to the first gate line;
a first pixel electrode electrically connected to the first switching element;
a second pixel electrode electrically connected to the second switching element, and the second pixel electrode disposed adjacent to the first pixel electrode and extending in a direction of the second gate line;
a main storage electrode disposed in an area between the first pixel electrode and the second electrode to overlap with first ends of the first and second pixel electrodes, and the main storage electrode receiving a common voltage; and
a sub-storage electrode spaced apart from the first and second gate lines, and the sub-storage electrode partially overlapped with second ends of the first and second pixel electrodes,
wherein the first pixel electrode is located between the data line and the second pixel electrode such that a side of the first pixel electrode is adjacent the data line and an opposing side of the first pixel electrode is adjacent the second pixel electrode.

5. The display panel of claim 4, wherein the first switching element includes a gate electrode electrically connected to the first gate line via a first contact electrode, a source electrode electrically connected to the data line via a second contact electrode, and a drain electrode electrically connected to the first pixel electrode.

6. The display panel of claim 5, wherein the second switching element includes a gate electrode electrically connected to the second gate line via a third contact electrode, a source electrode electrically connected to the data line, and a drain electrode electrically connected to the second pixel electrode.

7. The display panel of claim 6, further comprising a coupling line protruding from the data line, wherein the coupling line is connected to the source electrode of the second switching element via a fourth contact electrode.

8. The display panel of claim 5, wherein the main storage electrode includes a first portion overlapped with the data line, a second portion formed in a region interposed between the first and second pixel electrodes, a third portion adjacent to the second gate line to connect a first end of the first portion with one end of the second portion, and a fourth portion adjacent to the first gate line to connect to a second end of the second portion.

9. The display panel of claim 8, wherein the sub-storage electrode remains in an electrically floating state.

10. The display panel of claim 9, wherein the sub-storage electrode includes a first portion overlapped with the second portion of the main storage electrode, a second portion partially overlapped with the third portion of the main storage electrode, and a third portion partially overlapped with the fourth portion of the main storage electrode.

11. A display panel comprising:
a display substrate and an opposing display substrate coupled to the display substrate, the opposing substrate including a common electrode, wherein the display substrate comprises:
a first switching element connected to a data line and a first gate line;
a second switching element connected to the same data line and a second gate line adjacent to the first gate line;
a first pixel electrode electrically connected to the first switching element;
a second pixel electrode electrically connected to the second switching element, and the second pixel electrode disposed adjacent to the first pixel electrode and extending in a direction of the second gate line;
a main storage electrode disposed in an area between the first pixel electrode and the second electrode to overlap with first ends of the first and second pixel electrodes, and the main storage electrode receiving a common voltage; and
a sub-storage electrode spaced apart from the first and second gate lines, and the sub-storage electrode partially overlapped with second ends of the first and second pixel electrodes,
wherein one of the second ends is substantially adjacent the first gate line and the other second end is substantially adjacent the second gate line.

12. The display panel of claim 11, wherein the second ends are on opposite sides of an area including the first and second pixel electrodes.

* * * * *